Patented July 26, 1938

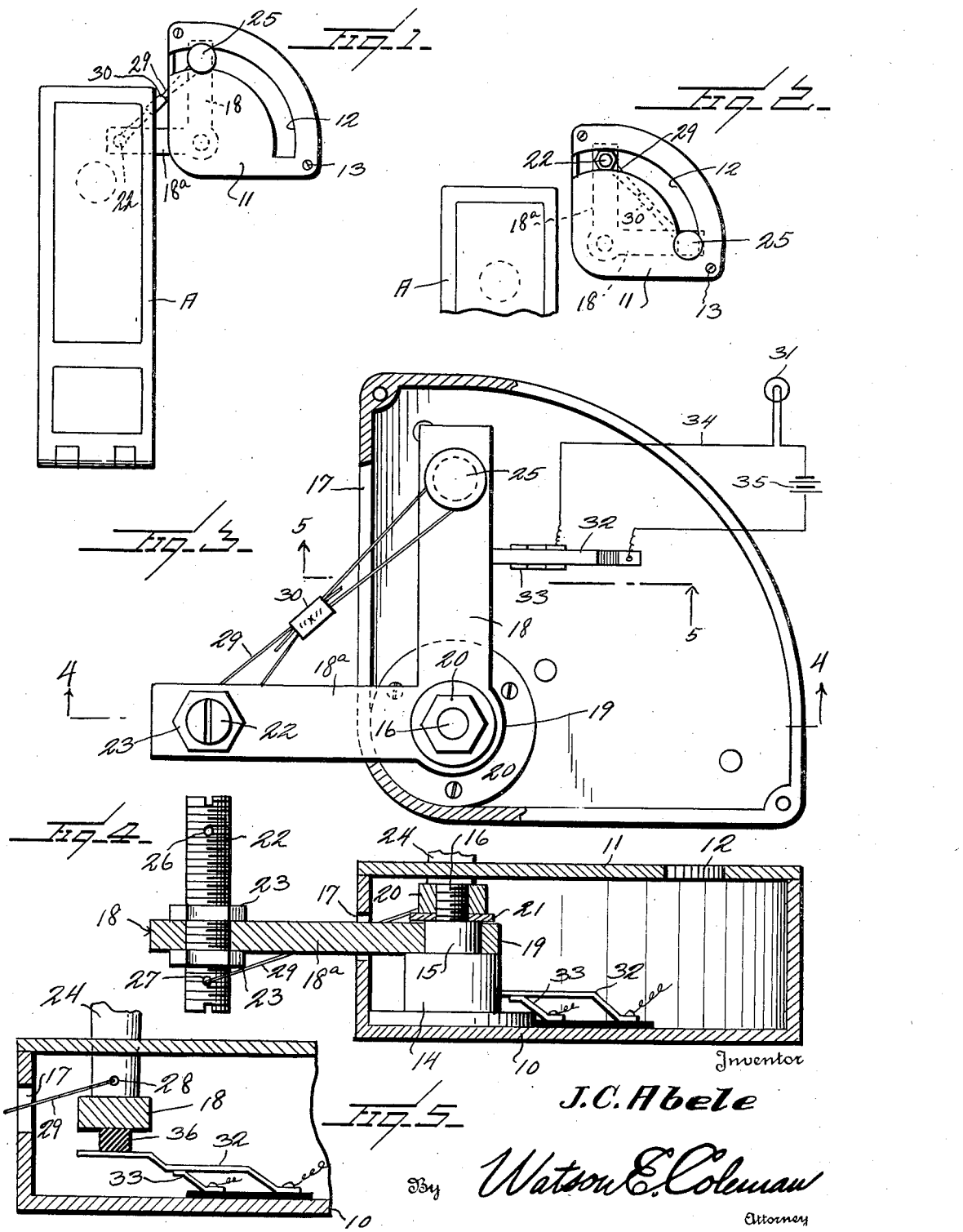

2,124,683

UNITED STATES PATENT OFFICE 2,124,683

SPEED CONTROLLER FOR AUTOMOTIVE VEHICLES

John Christian Abele, Philadelphia, Pa.

Application February 11, 1937, Serial No. 125,343

2 Claims. (Cl. 74—526)

This invention relates to speed controlling devices for automotive vehicles, particularly for that class of speed controlling devices in which means are provided for preventing the machine from traveling at a greater rate of speed than the law allows.

The object of the invention is to provide a controlling device of this character which prevents the depression of the accelerator pedal beyond a predetermined point and thus prevents the acceleration of the car beyond a certain speed under certain circumstances, and particularly to provide means whereby the stop for the accelerator may be sealed in set position by a state, county or city official.

Another object is to provide such a device which may be shifted into or out of operative accelerator limiting position at the will of the driver so that, for instance, in traveling in a down or city, it may be used to limit the speed or may be put out of use as a speed limiting device when traveling upon open roads or speedways, and in this connection to provide a visible signal which, when the speed limiting device is in use, will be displayed and which will be de-energized when the controlling device is out of use so that, for instance, in traveling through a city or town, if the signal device is not energized, a police officer will see immediately that there is no controlling device in use upon the car and can arrest the driver.

Other objects will appear in the course of the following description.

My invention is illustrated in the accompanying drawing wherein:

Figure 1 is a top plan view of the accelerator pedal of a car with my device mounted in conjunction therewith.

Figure 2 is a like view to Figure 1 but showing the contolling device as shifted out of its operative engagement with relation to the accelerator pedal.

Figure 3 is a top plan view of the casing of the device, the cover being removed and the wall of the casing being partly in section, showing the controller and illustrating diagrammatically the connection of the controller with a signal lamp.

Figure 4 is a section on the line 4—4 of Figure 3.

Figure 5 is a fragmentary section on the line 5—5 of Figure 3.

Referring to the drawing and particularly to Figures 3, 4 and 5, 10 designates the body of a casing adapted to be attached to the floorboards of the car or in any other convenient position, and having a cover 11, this cover being formed with the arcuate slot 12. The cover is held in place by screws 13. Mounted upon the base 10 or body of the casing is a post 14 having a reduced portion 15 and a still further reduced screw-threaded portion 16. The adjacent side wall of the casing is formed with a slot 17. Mounted upon the portion 15 of the post 14 is a bell crank lever 18 having at the junction of its two arms the collar 19 which engages over the portion 15 of the post and oscillates thereon. This bell crank lever is held upon the post by means of a nut 20 and a washer 21.

One arm 18$^a$ of the bell crank lever is provided with a vertically adjustable stop in the form of a screw 22. This stop has threaded engagement with the arm 18$^a$ on the bell crank lever and is held in adjusted position by means of the lock nuts 23. By rotating the stop, it is obvious that it may be adjusted up or down as desired. The other arm of the bell crank lever 18 is provided at its extremity with a post 24, as shown in Figure 5 which operates within the arcuate slot 12, and which is shown as being provided with a head 25 at its upper end, which is greater in diameter than the width of the slot. The screw stop 22 is formed with openings 26 and 27, see Figure 4, and the post 24 is likewise provided with one or more openings 28. By this means, a wire 29 may be inserted through apertures 26 or 27 and the opening 28 and then sealed by means of a lead seal 30, as shown in Figure 3, thus preventing any turning of the screw 22 either up or down.

While I have shown a locking wire and a seal of a particular construction, I do not wish to be limited to the use of a wire connected to the post 24 as a locking means, as other locking means and sealing means might be provided to prevent the unauthorized adjusting of the screw 22. It is intended that the screw 22 shall be adjusted to a certain distance below the accelerator pedal A by an official of the state or municipal government and should remain in this adjusted position unless it be again adjusted by said official and that the breakage of the seal 30 will indicate unauthorized tampering with this limiting stop.

When the bell crank lever is in the position shown in Figure 3 and in Figure 1, the stop screw 22 will be disposed immediately beneath the accelerator pedal A and will prevent this accelerator pedal being depressed beyond a certain point, thus preventing the machine from being accelerated over a certain speed. Of course, when the bell crank lever is turned to the position shown in Figure 2, it does not act as a limiting stop upon the accelerator pedal.

For the purpose of displaying a signal on the car, which signal shall be actuated automatically when the device is in operative position, I provide an electric lamp 31, as shown in Figure 3, and provide the two contacts 32 and 33, as shown in Figure 4, one of these contacts being a spring contact so as to be urged away from the contact 33 by its resilience. These contacts are connected by the conductors 34 to a battery 35 and to the lamp. When the bell crank lever 18 is in the position shown in Figures 1 and 3, one arm of this bell crank lever will engage the contact 32 and force it down into engagement with the contact 33 and thus close the circuit and cause the lamp 31 to be energized. When the bell crank lever is shifted to the position shown in Figure 2, however, the contact 32 is free to spring away from the contact 33 and thus break the circuit to the lamp. As illustrated in Figure 5, the contact 32 carries a block of insulation designated 36. Any means for insulating this contact from the post 24 may be used, however.

The use of this device will be obvious. Assuming that the screw 22 has been adjusted to the desired height and sealed in this adjusted position by a traffic authority, then when the car is travelling over an open road where, for instance, the speed is not limited to the extent to which it is ordinarily limited in cities or towns, the driver simply shifts the bell crank lever which constitutes a carrier for the stop into the position shown in Figure 2, where it is entirely free from any possible engagement with the accelerator pedal when the latter is depressed. This permits the car to be driven at any desired speed along country or open roads. When, however, the driver enters a town or city where the speed is limited by law, he shifts the bell crank lever outward by means of the knob 25 so that the arm 18ª extends beneath the accelerator pedal. This limits the depression of the accelerator pedal as previously described. The shifting of the device to an operating position energizes the signal lamp 31 which may be a plain lamp, a green lamp or a red lamp if desired, and a police officer can see the signal and know that the car is provided with this speed limiting device and that the device is in use and that, therefore, the operator of the car cannot go over the certain maximum speed. If, however, the police officer does not see this signal lamp 31, he knows that the car is not provided with a speed regulating device (which, it is to be assumed, is required by law) or that the driver has neglected, either intentionally or accidently, to use the speed limiting device, and he can then stop the car and warn the driver or arrest him.

It will be seen that this device will materially reduce accidents in crowded traffic and also that it will prevent the quick "get-away" of criminals who use automobiles as a means of escape, for the reason that they will not desire to use the speed limiting device but to drive the car as rapidly as possible and hence the car will be a marked car liable to be stopped at any time by police because of the fact that the signal light 31 is not burning.

Of course, regulations as to speed will be laid down by the state highway department. The licensed inspector of motor vehicles will set the regulator stop 22 to conform with the state speed law for driving in cities, towns and built-up sections. He will then lock the stop screw with the two lock nuts 23 at top and bottom and will put the lead seal on the device which is not to be broken either by the operator or the owner of the automobile. It will, of course, be unlawful to operate a car in a city, town or built-up section having traffic control signs unless this device is in service.

With the device in service, an automotive vehicle cannot go over the maximum speed permitted by the speed law and the fact that this device is in service will be indicated by the green signal light 31 preferably mounted on the front of the car or the top of the car above the windshield. The purpose of the relatively high post 14 is to keep the bell crank lever and keep the stop sufficiently high above the floorboard so that the stop can be adjusted and locked in place. If the operator has this safety device in service, he cannot exceed the state speed law with the foot accelerator action. If the operator has this safety device out of service in places where the maximum speed is limited, he will at once be stopped by the police, as the signal light will be out, which informs the policeman that the operator is not complying with the law.

While I have indicated certain details of construction and arrangement of parts, it is to be understood that many changes might be made therein without departing from the spirit of the invention as defined in the appended claims.

What is claimed is:

1. A device of the character described, including a casing having an opening in one face, a two-armed element pivoted at the junction of the arms in said casing, one arm of the element extending out through said opening, a stop screw carried by the last named arm and vertically adjustable through the arm, a wire passing through said stop screw and operatively connected to the other arm, and a seal engaging the ends of the wire, the wire thus locking the screw from turning movement after it has been adjusted.

2. A device of the character described, including a two-armed element pivoted at the junction of its arms, a vertically adjustable stop carried by one arm of the element, a wire passing through said stop, and a seal engaging the ends of the wire, the wire locking the stop from vertical movement after it has been adjusted.

JOHN CHRISTIAN ABELE.